(12) United States Patent
Miyashita et al.

(10) Patent No.: US 6,935,181 B2
(45) Date of Patent: Aug. 30, 2005

(54) ANTICORROSIVE VACUUM SENSOR

(75) Inventors: Haruzo Miyashita, Yamanashi (JP);
Yasuyuki Kitamura, Miyagi (JP);
Masayoshi Esashi, 11-9,
Yagiyamaminami 1-chome, Taihaku-ku,
Sendai-shi, Miyagi 982-0807 (JP)

(73) Assignees: Anelva Corporation, Tokyo (JP);
Masayoshi Esashi, Miyagi (JP)

( * ) Notice: Subject to any disclaimer, the term of this patent is extended or adjusted under 35 U.S.C. 154(b) by 0 days.

(21) Appl. No.: 10/842,437

(22) Filed: May 11, 2004

(65) Prior Publication Data

US 2004/0206185 A1 Oct. 21, 2004

Related U.S. Application Data

(63) Continuation of application No. 09/798,959, filed on Mar. 6, 2001, now abandoned.

(30) Foreign Application Priority Data

Mar. 7, 2000 (JP) .......................................... 2000-62095
Jan. 12, 2001 (JP) .......................................... 2001-4387

(51) Int. Cl.$^7$ ............................................... G01L 9/12
(52) U.S. Cl. ........................................................ 73/718
(58) Field of Search ............................ 73/718, 724, 706; 361/283.1, 283.12, 283.3, 283.4

(56) References Cited

U.S. PATENT DOCUMENTS 5,001,595 A * 3/1991 Dittrich et al. .......... 361/283.4
5,076,147 A * 12/1991 Hegner et al. .......... 92/103 SD
5,088,329 A    2/1992 Sahagen ...................... 73/727
6,097,821 A    8/2000 Yokoyama et al. ......... 381/191
6,225,668 B1   5/2001 Shindo et al. .............. 257/368
6,240,785 B1   6/2001 Chapman et al. ............ 73/727

FOREIGN PATENT DOCUMENTS

JP           61266931           11/1986

OTHER PUBLICATIONS

K. Hatanaka et al., "Silicon Diaphragm Capacitive Vacuum Sensor," 1995, Technical Digest of The 13$^{th}$ Sensor Symposium, pp. 37–44, no month.

* cited by examiner

Primary Examiner—William Oen
(74) Attorney, Agent, or Firm—Wenderoth, Lind & Ponack, L.L.P.

(57) ABSTRACT

A capacitive vacuum sensor includes an elastic diaphragm electrode and a rigid fixed electrode opposite the elastic diaphragm electrode. An internal space is defined between the elastic diaphragm electrode and the rigid fixed electrode. The elastic diaphragm electrode deflects elastically in response to any change in the pressure of a gas applied on the elastic diaphragm electrode, and the capacitive vacuum sensor is responsive to any change in the capacitance between the elastic diaphragm electrode and the rigid fixed electrode that may occur in accordance with the deflection of the elastic diaphragm electrode so that it can measure the pressure of the gas. The vacuum sensor can include an anticorrosive diaphragm electrode that can resist the corrosive action of the reactive gas when it is exposed to such gas, and can be fabricated by the micromachining technology.

14 Claims, 3 Drawing Sheets

ANTICORROSIVE VACUUM SENSOR

This is a continuation application of Ser. No. 09/798,959 filed Mar. 6, 2001 now abandoned.

BACKGROUND OF THE INVENTION

1. Field of the Invention

The present invention relates to a capacitive vacuum sensor, and more particularly to an anticorrosive capacitive vacuum sensor. The anticorrosive vacuum sensor includes a diaphragm electrode section, which has high resistance to the corrosive action of any gas that would affect the performance of the diaphragm electrode when it is exposed to such gas, and can measure the degree of vacuum under such gaseous environment with high reliability and stability over a long-term lifetime.

2. Prior Art

The manufacture of electronics components or semiconductor devices or products involves a thin film deposition or etching process that must be carried out within strictly controlled vacuum equipment. This process usually proceeds within vacuum equipment that is kept at a constant pressure. The pressures that exist within the vacuum equipment are often measured by means of capacitive vacuum sensors that provide accurate pressure measuring capabilities regardless of the type of gases use.

Most of the existing capacitive vacuum sensors that are commercially available are manufactured by a mechanical machining technique. However, a micromachining technique may be used to produce more compact sensors on a massive production basis and at reduced costs.

FIG. 3 shows one typical example of a conventional capacitive vacuum sensor that may be manufactured by using the micromachining technique. This capacitive vacuum sensor includes a non-conducting substrate 2 made of glass (referred to as glass substrate) and a silicon substrate 3 that are bonded together. The glass substrate 2 has electrically conductive leads 1 that extend through the substrate 2 for providing respective electrical paths between the top and bottom sides thereof, and the silicon substrate 3 has a recess formed on either side thereof.

There is a reference pressure space 4 that is internally delimited by the silicon substrate 3 and glass substrate 2, and which is kept at high vacuum. A getter 5 is provided within the recess on the silicon substrate 3, and communicates with the reference pressure space 4 so that it can absorb any part of the gas that remains within the reference pressure space 4. In this way, the reference pressure space 4 may be kept at high vacuum.

The silicon substrate 3 includes a boron diffused silicon layer 7 that is formed on the upper surface by diffusing boron to a depth of 2 $\mu$m to 8 $\mu$m. On the bottom side, the silicon substrate 3 is partially etched, thereby exposing the above boron diffused silicon layer 7 from the bottom side. This exposed boron diffused silicon layer 7 acts as a diaphragm electrode 6. That is, the diaphragm electrode 6 is formed from silicon that contains boron diffused throughout the depth of 2 $\mu$m to 8 $\mu$m.

The diaphragm electrode 6 may deflect when a certain gas pressure from any external source is applied upon the diaphragm electrode 6. This deflection may occur in accordance with the applied gas pressure, which causes a corresponding change in the capacitance between the rigid fixed electrode 8 and diaphragm electrode 6. The change in the capacitance may be provided in the form of a corresponding electrical signal. The electrical signal is transmitted from the fixed electrodes 8 through the electrically conductive leads 1 to electrode pads 9, respectively. The electrode pads 9 are coupled to the signal processing circuit (not shown), where the signal may be processed to determine the current pressure of the gas applied from the external source.

FIG. 5(a) through FIG. 5(e) depict the process of manufacturing the conventional capacitive vacuum sensor in FIG. 3 by the micromachining technique.

Specifically, the process is described by referring to FIG. 5(a) to FIG. 5(e). In the step of FIG. 5(a), a thermally oxidized layer 10 is first formed on the surface of the silicon substrate 3 having a recess on the upper side thereof, and the portion of the thermally oxidized layer 10 located on the upper side of silicon substrate 3 is then patterned by masking.

In the step of FIG. 5(b), boron is doped into the silicon substrate 3 on its upper side so that it can diffuse throughout the thickness of 2 $\mu$m to 8 $\mu$m. The result is the boron-diffused layer 7.

In the step of FIG. 5(c), the thermally oxidized layer 10 on the upper side of the silicon substrate 3 is removed, and the thermally oxidized layer 10 on the lower side of the silicon substrate 3 is then patterned by masking.

In the step of FIG. 5(d), a getter 5 is inserted between the silicon substrate 3 obtained through the steps FIG. 5(a) through FIG. 5(c), and the glass substrate 2 that carries the electrode pads 9 on one side (upper side, in this case) and the fixed electrodes 8 on the other side (lower side) that are interconnected with each other by the electrically conducting leads 1, respectively, and the silicon substrate 3 and glass substrate 2 are anodically bonded together into a single unit substrate under a vacuum atmosphere. The single unit substrate thus obtained includes a reference pressure space 4 that is internally delimited by the silicon substrate 3 and glass substrate 2.

In the step of FIG. 5(e), when the single unit substrate including the glass substrate 2 and silicon substrate 3 bonded together is immersed in an etching liquid, such as ethylenediaminepyrocatechol (EDP) water, the glass substrate 2 and the thermally oxidized layer 10 thereon will not be etched, while the exposed area of the silicon substrate 3 that is not covered with the thermally oxidized layer 10 will be removed by etching. This etching progresses deep into the silicon substrate 10 until the boron diffused silicon layer 7 is exposed. As the ethylenediaminepyrocatechol water has no etching effect on the boron-doped silicon, the etching will stop where and when the boron diffused silicon layer 7 has been exposed. Finally, the capacitive vacuum sensor is thus obtained, and includes a diaphragm electrode 6 formed by the boron diffused silicon layer 7 that is 2 $\mu$m to 8 $\mu$m thick.

Various types of gases may be utilized during the process of manufacturing semiconductor devices or electronics components. Some of the gases may contain reactive gases that have corrosive action. When the diaphragm electrode is exposed to the reactive gases, it may be affected by the corrosive action. If the capacitive vacuum sensor includes a diaphragm electrode that is easy to be affected by the corrosive action, it may have a shorter lifetime. Thus, the capacitive vacuum sensor cannot provide the long-term reliable pressure measuring capabilities.

Particularly, in the dry etching equipment, some gases that contain fluorine reactive gases may be used in manufacturing silicon-based semiconductor devices. In this case, the capacitive vacuum sensor including the silicon-based diaphragm electrode may be used to measure the pressures in the fluorine gas atmosphere. During the process, the diaphragm electrode is always exposed to the fluorine reactive gases that have the etching effect on the diaphragm electrode. Thus, the diaphragm electrode may be damaged seriously.

SUMMARY OF THE INVENTION

An object of the present invention is to provide a capacitive vacuum sensor that may be manufactured by using a micromachining technology that allows for the manufacture of compact products on a massive production basis. The capacitive vacuum sensor thus manufactured can guarantee a long-term, reliable and stable operation by providing high resistance to the corrosive action of any reactive gases even when it is exposed to such reactive gases during the process of manufacturing the semiconductor devices or electronics components.

The present invention proposes to solve the problems of the prior art in several aspects by providing an anticorrosive capacitive vacuum sensor.

In one aspect, the anticorrosive vacuum sensor according to the present invention may be manufactured by using the micromachining technique, and includes the diaphragm electrode that is highly resistant to the corrosive action.

In another aspect, the anticorrosive vacuum sensor according to the present invention includes the anticorrosive diaphragm electrode that may be formed like a thin film diaphragm that is slightly stressed to provide tensile stress. This permits the sensor to measure the pressures accurately.

In still another aspect, the anticorrosive vacuum sensor of the present invention can determine any change in the capacitance accurately, even if the anticorrosive diaphragm electrode is relatively less conductive due to the type of material used for forming it. To this end, an electrically conductive thin film may be deposited on the side of the diaphragm electrode facing the fixed electrodes, or the diaphragm electrode may contain any doped impurities that enhance the conductivity of the diaphragm electrode. This permits the sensor to respond accurately to any change in the capacitance that develops between the diaphragm electrode and fixed electrodes.

The present invention concerns the capacitive vacuum sensor that includes an elastic diaphragm electrode and rigid fixed electrodes arranged to face opposite the elastic diaphragm electrode, with an internal space being delimited between the elastic diaphragm electrode and rigid fixed electrodes. The elastic diaphragm electrode deflects elastically in response to any change in the gas pressure applied on the elastic diaphragm electrode. The capacitive vacuum sensor is responsive to any change in the capacitance between the elastic diaphragm electrode and rigid fixed electrodes that may occur in accordance with the deflection of the elastic diaphragm electrode so that it can measure the pressure of the gas.

More specifically, the present invention provides an anticorrosive capacitive vacuum sensor that may be manufactured by using the micromachining technique, and includes an anticorrosive elastic diaphragm electrode. In this specification, the term "anticorrosive" means that the diaphragm electrode can resist the corrosive action of the gas that would affect the diaphragm electrode.

The anticorrosive diaphragm electrode may be formed from any materials that exhibit chemical stability. For example, the capacitive vacuum sensor can include silicon-based elastic diaphragm electrode to be used on the vacuum equipment to measure the pressure of a gas within the vacuum equipment. The gas used in the vacuum equipment is a reactive gas, such as fluorine gas, that generates halogen radicals such as fluorine radicals. Any materials, such as silicon carbide, alumina, or aluminum nitride, that exhibit chemical stability and have the high resistance to the halogen radicals such as fluorine radicals may be used to form the anticorrosive diaphragm electrode.

The anticorrosive vacuum sensor according to the present invention may be manufactured by using the micromachining technique, which allows high-precision and compact-size vacuum sensors to be manufactured on the massive production basis.

In the present invention, the anticorrosive diaphragm electrode that is the essential part of the capacitive vacuum sensor is formed from any of the chemically stabilized materials such as those mentioned above. Therefore, even when the vacuum sensor is used in the reactive gas atmosphere under which semiconductor devices or electronics components are fabricated, and is always exposed to the corrosive action of the reactive gas, there is no risk that the diaphragm electrode within the vacuum sensor will be affected by the corrosive action of the reactive gas. Thus, the vacuum sensor can have a long lifetime, and can measure the degree of vacuum with high reliability and high stability.

Preferably, the anticorrosive diaphragm electrode may be formed as a thin-film diaphragm that is slightly stressed to provide tensile stress. In this way, the anticorrosive diaphragm electrode formed as the thin-film diaphragm can be maintained in its flat state under the applied tensile stress. This permits the vacuum sensor to measure the pressures accurately.

The anticorrosive diaphragm electrode that is formed as the thin-film diaphragm electrode being slightly stressed to provide the tensile stress is manufactured by the following method. For example, a thin film that is composed of any anticorrosive material may be deposited on the side of the diaphragm electrode being formed that is located facing the rigid fixed electrodes, by using the chemical vapor deposition (CVD) method, evaporation method, sputtering method or the like, under conditions in which the type of gas used, ambient temperature, power supply, deposition time (processing time) and other parameters are well controlled. That is to say, during the thin film deposition process, the above-mentioned parameters are controlled to avoid the minimum requirement that the thin film being deposited is stressed to provide a compressive stress.

In the anticorrosive vacuum sensor of the present invention as described above, the anticorrosive diaphragm electrode preferably may contain any doped impurities, such as boron (B), phosphorous (P) and the like, that may enhance the conductivity of the diaphragm electrode. Alternatively, an electrically conductive thin film preferably may be deposited on the side of the anticorrosive diaphragm electrode facing the rigid fixed electrodes. For the latter case, the diaphragm electrode may include the anticorrosive diaphragm electrode coupled with the electrically conductive thin film.

The anticorrosive diaphragm electrode might become less conductive, depending upon the type of material used for forming the anticorrosive diaphragm electrode, or depending upon the condition under which the thin film for the anticorrosive diaphragm electrode is deposited and allowed to grow on the side of the diaphragm electrode facing the rigid fixed electrodes. Therefore, by using the chemical vapor deposition (CVD) or sputtering process, the vacuum sensor including the diaphragm electrode might fail to respond to any change in the capacitance between the fixed electrodes and diaphragm electrode accurately.

According to the present invention, the anticorrosive diaphragm electrode can operate and determine any change in the capacitance that develops between the diaphragm electrode and fixed electrodes under such situations by and through forming the anticorrosive diaphragm electrode containing any doped impurities as described above.

It may be understood from the foregoing description that the anticorrosive vacuum sensor according to the present invention includes the elastic diaphragm electrode that may be formed from any chemically stabilized materials, such as silicon carbide, alumina or aluminum nitride. Therefore, when the vacuum sensor is placed in the reactive gas atmosphere where it is exposed to the corrosive action of a reactive gas, such as fluorine gases, that produces halogen radicals such as fluorine radicals, the diaphragm electrode within the vacuum sensor can resist the corrosive action of the reactive gas. Thus, the vacuum sensor can provide reliable and accurate pressure measuring capabilities for a long-term period.

It may also be understood that the vacuum sensor according to the present invention may be manufactured by the micromachining technique. Thus, the vacuum sensor thus obtained can have the uniform quality and high precision.

While retaining the features of the compactness and massive production offered by the micromachining technique, the anticorrosive vacuum sensor may be provided simply by modifying the conventional silicon-based diaphragm electrode manufacturing process. Thus, the costs required to modify the conventional process into the inventive process for manufacturing the anticorrosive vacuum sensor of the present invention can be minimized.

DETAILED DESCRIPTION OF THE INVENTION

Figure 1:
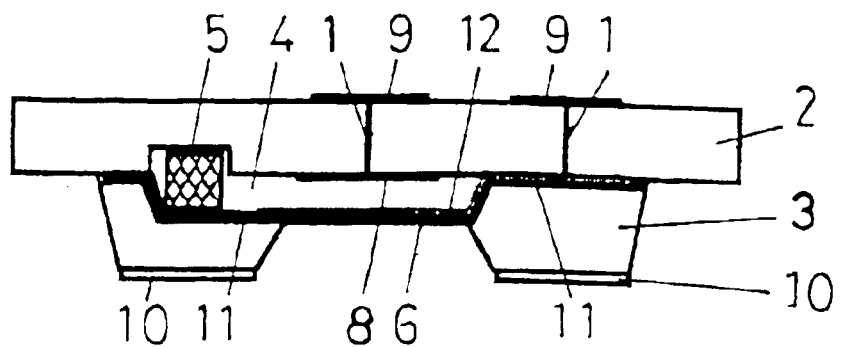
FIG. 1 represents one preferred embodiment of the present invention.

Referring now to FIG. 1, a preferred embodiment of the present invention will be described.

FIG. 1 shows the anticorrosive vacuum sensor according to the present invention, which may be manufactured by a micromachining technique and which includes a glass substrate 2 and a silicon substrate 3 that are bonded together into a single unit substrate having the dimensions of several mm to several 10 mm square and 1 mm thick.

The glass substrate 2 is a non-conducting substrate having rigid fixed electrodes 8 and electrode pads 9 on the lower and upper sides thereof, respectively. The rigid fixed electrodes 8 and the corresponding electrode pads 9 are interconnected by way of electrically conducting leads 1 extending through the glass substrate 2 and across the same. The silicon substrate 3 is a monocrystalline substrate having a recess formed on each of the upper and lower sides thereof. There is a reference pressure space 4 that is formed between the glass substrate 2 and silicon substrate 3 when they are anodically bonded together under the vacuum atmosphere. The reference pressure space 4 is delimited by the two substrates 2 and 3, and is kept at high vacuum.

It may be seen from FIG. 1 that the glass substrate 2 has a recess that communicates with the reference pressure space 4 and within which a getter 5 is provided. This getter 5 absorbs any part of the gas that remains in the reference pressure space 4, and keeps reference pressure space 4 at the high vacuum.

The silicon substrate 3 further includes a silicon carbide layer 11 on the side thereof facing the glass substrate 2, and the silicon carbide layer is deposited to a thickness of 2 $\mu$m to 8 $\mu$m by the chemical vapor deposition (CVD) method. The silicon substrate 3 has a deep recess partially formed on the side thereof opposite the side on which the silicon carbide layer 11 is located, from which the silicon carbide layer 11 is exposed. This exposed portion of the silicon carbide layer 11 acts as the elastic diaphragm electrode 6.

It may be seen from FIG. 1 that an electrically conductive thin film 12 such as metal may be deposited on the side of the silicon carbide layer 11 facing the rigid fixed electrodes 8. Part of the electrically conductive thin film 12 makes contact with the electrically conducting leads 1 extending through the glass substrate 2. Thereby, electrically conductive thin film 12 and the electrode pads 9 on the upper side of the glass substrate 2 are interconnected by way of electrically conductive leads 1.

In some cases, the silicon carbide layer 11 may become less conductive, depending upon the particular condition under which the silicon carbide layer 11 is to be deposited and grown on the side of the silicon substrate 3 facing the glass substrate 2 by using the chemical vapor deposition (CVD) method. In such cases, the silicon carbide layer 11 alone is not sufficient to work as the electrode. However, when the silicon carbide layer 11 is coupled with the electrically conductive thin film 12, any deflection of the silicon carbide layer 11 can be sensed by the electrically conductive thin film 12.

In the embodiment in which the electrically conductive thin film 12 is deposited on the side of the silicon carbide layer 11 facing the rigid fixed electrodes 8, as described above, the diaphragm electrode 6 may include the silicon carbide layer 11 and the electrically conductive thin film 12 deposited thereon.

In operation, when any change in pressure occurs outside the vacuum sensor, it causes pressure within the region located below the diaphragm electrode 6 (FIG. 1) and causes the vacuum equipment to change accordingly. The change in the pressure within the region causes the diaphragm electrode 6 to be deflected accordingly. In response, the capacitance that develops between the diaphragm electrode 6, or electrically conductive thin film 12, and the rigid fixed electrodes 8 will change according to the deflection of the diaphragm electrode 6. The change in the capacitance is provided in the form of an electrical signal which appears at the electrode pads 9. The electrode pads 9 may be coupled with any suitable signal processing circuit (not shown), so that the electrical signal may be processed to determine the current pressure applied from the external source.

In the anticorrosive vacuum sensor according to the current embodiment, the part of the diaphragm electrode 6 that is exposed to the reactive gas, more specifically, the silicon carbide layer 11 forming the bottom of the diaphragm electrode 6, has chemical stability as well as a strong resistance to the corrosive action of the reactive gas. For example, when the anticorrosive vacuum sensor of the current embodiment is used on dry etching equipment, in which silicon is usually processed in the fluorine reactive gas atmosphere, it can operate and measure pressures for an extended period of time with stability and without being affected by the corrosive action of the reactive gas.

FIG. 4(a) through FIG. 4(f) depict the process of manufacturing the anticorrosive vacuum sensor according to the present invention that has been described so far by referring to FIG. 1. The anticorrosive vacuum sensor shown in FIG. 1 may be manufactured by the micromachining technique method, which includes the following steps that are described below.

Figure 4A:
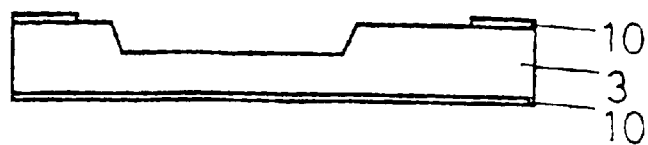
FIG. 4(a) represents how a thermally oxidized layer is formed on the silicon substrate, and the portion of the thermally oxidized layer located on the upper side of the silicon substrate is then patterned by masking.

In the step shown in FIG. 4(a), a thermally oxidized layer 10 is formed on the silicon substrate 3 having a recess on the upper side thereof, and the portion of the thermally oxidized layer 10 located on the upper side of silicon substrate 3 is then patterned by masking.

Figure 4B:
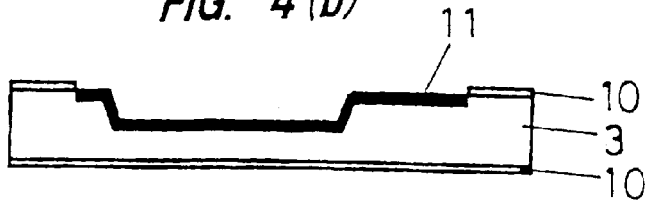
FIG. 4(b) represents how a silicon carbide layer is formed on the upper side of the silicon substrate.

In the step shown in FIG. 4(b), a silicon carbide layer 11 is deposited on the upper side of the silicon substrate 3 by the chemical vapor deposition (CVD) method so that it can have a thickness of 2 $\mu$m to 8 $\mu$m. When the silicon carbide layer 11 is deposited, the conditions such as the flow rate of a gas, the ambient temperature, and the stoichiometric ratio are controlled, so that the formed silicon carbide layer 11 has a slight tensile stress.

Figure 4C:
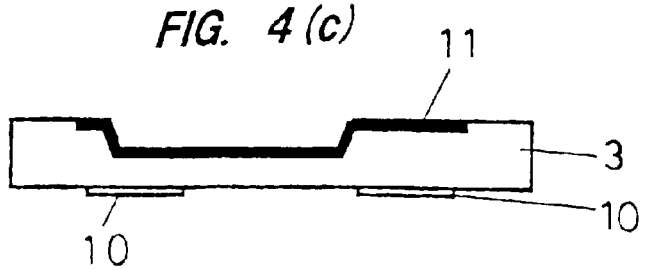
FIG. 4(c) represents how the portion of the thermally oxidized layer located on the upper side of the silicon substrate is removed, with the portion of the thermally oxidized layer exposed on the lower side being patterned by masking.

In the step shown in FIG. 4(c), the portion of the thermally oxidized layer 10 on the upper side of the silicon substrate 3 is removed, and the portion of the thermally oxidized layer 10 located on the bottom side of the silicon substrate 3 is then patterned by masking.

Figure 4D:
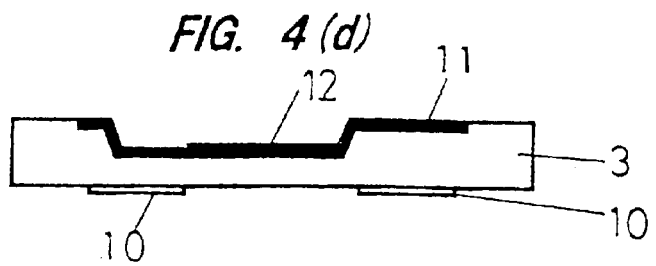
FIG. 4(d) represents how an electrically conductive thin film is formed on the silicon carbide layer.

In the step shown in FIG. 4(d), an electrically conductive thin film 12 such as metal is deposited on part of the upper side of the silicon carbide layer 11.

Figure 4E:
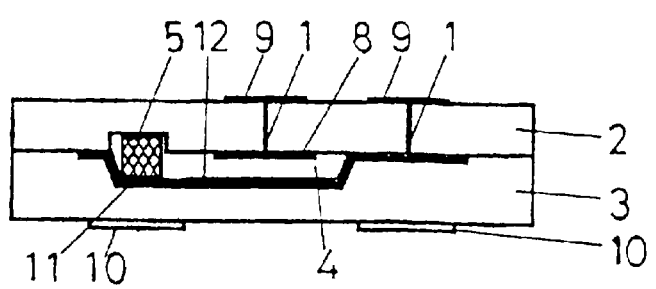
FIG. 4(e) represents how the glass substrate and silicon substrate are bonded together into a single unit substrate.

In the step shown in FIG. 4(e), the glass substrate 2 and the silicon substrate 3 being processed through the step of FIG. 4(a) to FIG. 4(d) are anodically bonded together into a single unit substrate under the vacuum atmosphere, with a getter 5 inserted between the two substrates 2 and 3. The single unit substrate thus obtained includes a reference pressure space 4 defined by the two substrates 2 and 3, and the reference pressure space is kept under a vacuum condition. The glass substrate 2 has a rigid fixed electrode 8 and electrode pads 9 on the lower and upper sides thereof, respectively. The rigid fixed electrode 8 and the corresponding electrode pads 9 are interconnected by way of electrically conducting leads 1 extending through the glass substrate 2.

Figure 4F:
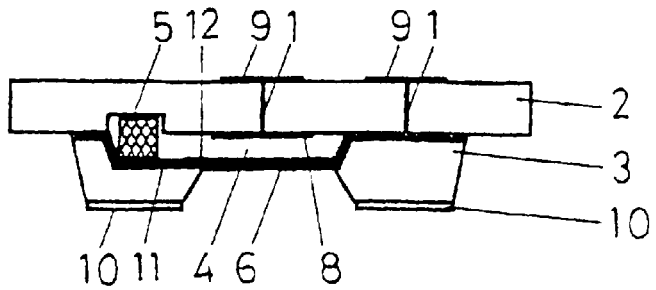
FIG. 4(f) represents the finished anticorrosive vacuum sensor of the present invention after having been processed through the steps represented by FIG. 4(a) through FIG. 4(e)
Figure 5A:
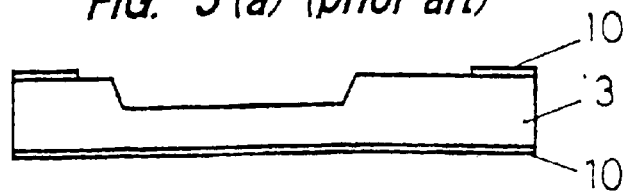
FIG. 5(a) represents how a thermally oxidized layer is deposited on a silicon substrate, and the portion of the thermally oxidized layer located on the upper side of the silicon substrate is then patterned by masking.
Figure 5B:
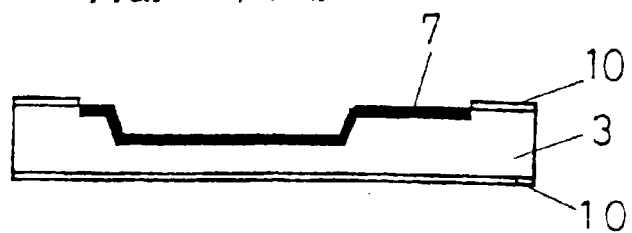
FIG. 5(b) represents how a boron diffused layer is deposited on the upper side of the silicon substrate.
Figure 5C:
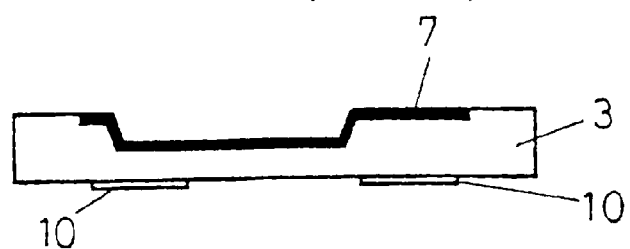
FIG. 5(c) represents how the portion of the thermally oxidized layer located on the upper side of the silicon substrate is removed, with the portion of the thermally oxidized layer exposed on the lower side being patterned by masking.
Figure 5D:
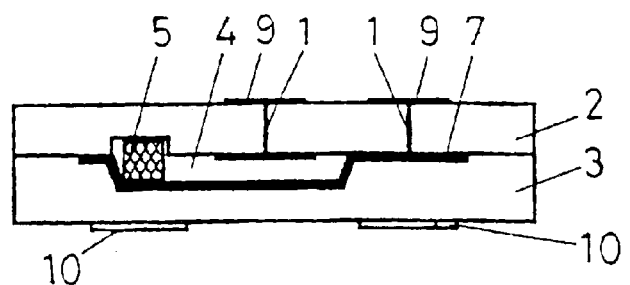
FIG. 5(d) represents how the glass substrate and silicon substrate are bonded together into a single unit substrate.
Figure 5E:
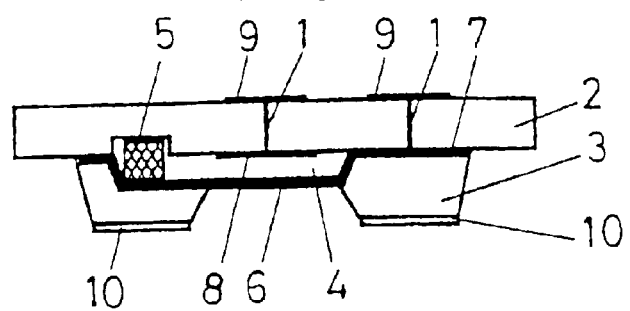
FIG. 5(e) represents the finished capacitive vacuum sensor of the prior art after having been processed through the steps represented by FIG. 5(a) through FIG. 5(d).

In the step shown in FIG. 4(f), the single unit substrate thus obtained is then immersed in a suitable etching liquid such as potassium hydroxide (KOH) solution. The glass substrate 2 and the portion of the thermally oxidized layer 10 on the bottom side of the silicon substrate 3 are not etched, with only the exposed silicon on the silicon substrate 3 being etched in the direction of the depth. This etching progresses until it reaches the rear side of the silicon substrate 3 (that is, the bottom side of the silicon substrate 3 in FIG. 4(e)) where the silicon carbide layer 11 will be exposed. As the potassium hydroxide solution has no etching effect on the silicon carbide layer 11, the etching stops where and when the silicon carbide layer 11 has been exposed. The final result is the anticorrosive vacuum sensor of the present invention that includes the diaphragm electrode 6 having the 2 $\mu$m to 8 $\mu$m-thick silicon carbide layer 11 and the electrically conductive thin film 12 deposited thereon.

As described in the step shown in FIG. 4(b) above, the silicon carbide layer 11 is stressed to provide the slight tensile stress when it is deposited so that it can be maintained in its flat condition even when the diaphragm electrode 6 is finally formed like a thin film diaphragm as shown in FIG. 4(f). This permits accurate pressure measurement.

More specifically, for example, if the silicon carbide layer 11 is stressed to provide a compressive stress when it is deposited, it might become so flexible that it cannot be maintained flat when the diaphragm electrode 6 is finally formed like the thin film diaphragm as shown in FIG. 4(f). If this occurs, the diaphragm electrode 6 might easily deflect even in the absence of the applied gas pressure. This would prevent an accurate pressure measurement. To avoid that situation, the diaphragm electrode 6 according to the present invention is formed such that its silicon carbide layer 11 is stressed to provide a slight tensile stress when it is deposited.

Figure 2:
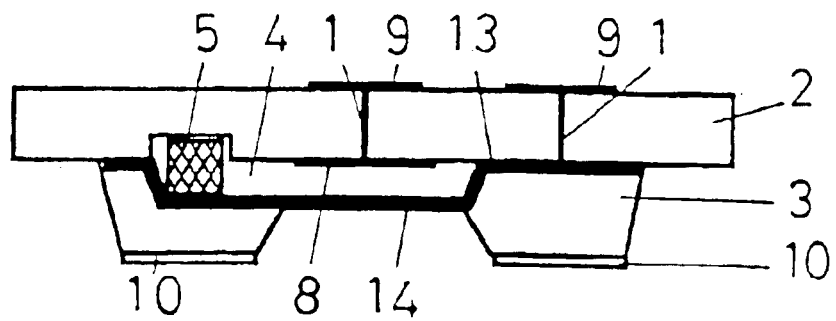
FIG. 2 represents another preferred embodiment of the present invention.
Figure 3:
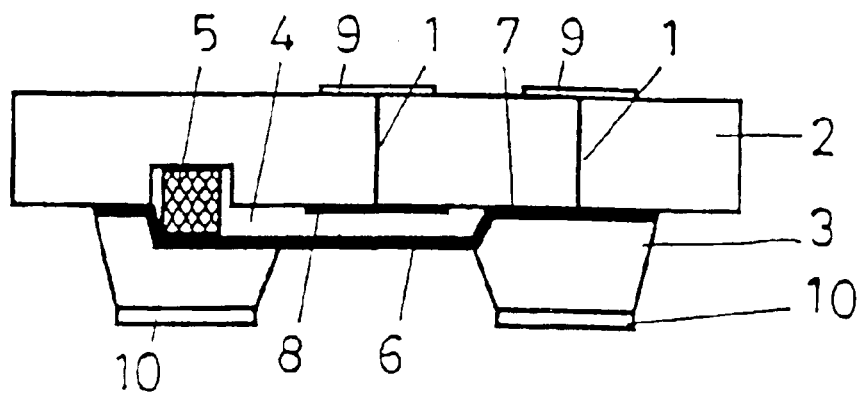
FIG. 3 represents one typical example of the prior art capacitive vacuum sensor.

FIG. 2 represents another embodiment of the anticorrosive vacuum sensor according to the present invention, wherein a silicon carbide layer 13 is deposited on the silicon substrate 3, but includes no electrically conductive thin film 12 as in the preceding embodiment. In the embodiment shown in FIG. 2, the anticorrosive vacuum sensor is able to respond to any deflection of the silicon carbide layer 13 even if there is no electrically conductive thin film 12 on the silicon carbide layer 13.

In this variation, when the silicon carbide layer is deposited as described in the step FIG. 4(b), any suitable impurities such as boron (B) or phosphorus (P) may be doped into the silicon carbide layer 13 as is usually done when semiconductor chips or devices are fabricated. The silicon carbide layer 13 containing those doped impurities can provide high conductivity by itself. In other words, a diaphragm electrode 14 may be provided by the silicon carbide layer 13 that contains the impurities, such as boron or phosphorus, that enhance the conductivity of the silicon carbide layer 13.

In accordance with the diaphragm electrode shown in FIG. 2 and obtained as above, whether the electrically conductive thin film 12 is present on the silicon carbide layer 13 or not, regardless of the particular type of material from which the silicon carbide layer may be made, and regardless of the particular conditions of the chemical vapor deposition (CVD) method under which the silicon carbide layer may be deposited and allowed to grow on the side of the silicon substrate 3 facing the glass substrate 2, it is possible for the vacuum sensor to respond to any deflection of the diaphragm electrode 14 since it or the silicon carbide layer can have good conductivity by itself.

In the embodiment and variation thereof as described above, the silicon carbide layer is composed of the chemically stabilized materials, and is deposited by using the chemical vapor deposition (CVD) method. Any other materials can be used as the chemically stabilized materials and any other method can be used for forming a thin film. For example, alumina, diamond, aluminum nitride, boron nitride and the like can be used as the chemically stabilized materials, and a thin film that forms the elastic diaphragm electrode may be obtained by depositing any of those materials by the injection, sputtering or vapor deposition method.

For example, when a thin film of aluminum nitride is deposited to form the diaphragm electrode 14, the reactive sputtering method may be used. The reactive sputtering method consists of depositing the thin film by causing the gas introduced into the vacuum equipment to react with a particular target material. In this example, the target material may be aluminum, and nitrogen gas may be fed into the chamber, where the nitrogen gas is allowed to react with the target, i.e., aluminum. Then, the thin film may be deposited by sputtering.

Those target materials and gases are utilized in the usual semiconductor manufacturing process. When a thin film is deposited on the substrate by using those target materials and gases, the deposition can occur while the substrate is maintained at a temperature below 500° C., which is less than the temperature at which the silicon carbide layer described above is deposited by the chemical vapor deposition (CVD) method. Thus, the process by which an anticorrosive thin film may be deposited can be simplified.

Although the present invention has been described with reference to the particular embodiments and variations thereof, it should be understood that various changes and modifications may be made without departing from the spirit and scope of the invention as defined in the appended claims.

What is claimed is:

1. An anticorrosive capacitive vacuum sensor manufactured by the micromachining technique, comprising:
an anticorrosive elastic diaphragm electrode operable to elastically deflect in response to a change in the pressure of a gas applied against said anticorrosive elastic diaphragm electrode, said anticorrosive elastic diaphragm electrode being formed of a chemically stabilized material other than monocrystalline silicon; and
a rigid fixed electrode arranged to face said anticorrosive elastic diaphragm electrode, said anticorrosive elastic diaphragm electrode and said rigid fixed electrode defining a closed space therebetween and being arranged such that a change in the capacitance between said anticorrosive elastic diaphragm electrode and said rigid fixed electrode occurs in response to the deflection of said anticorrosive elastic diaphragm electrode for measuring the pressure of the gas.

2. The anticorrosive capacitive vacuum sensor of claim 1, wherein said anticorrosive elastic diaphragm electrode comprises a thin film formed by a thin film deposition process.

3. The anticorrosive capacitive vacuum sensor of claim 1, further comprising a plurality of rigid fixed electrodes arranged to face said anticorrosive elastic diaphragm electrode.

4. The anticorrosive capacitive vacuum sensor of claim 1, wherein said anticorrosive elastic diaphragm electrode comprises a thin film diaphragm having a tensile stress.

5. The anticorrosive capacitive vacuum sensor of claim 4, wherein said anticorrosive elastic diaphragm electrode contains doped impurities for enhancing the conductivity of said anticorrosive elastic diaphragm electrode.

6. The anticorrosive capacitive vacuum sensor of claim 5, wherein said anticorrosive elastic diaphragm electrode is formed from one of silicon carbide, alumina and aluminum nitride.

7. The anticorrosive capacitive vacuum sensor of claim 4, further comprising an electrically conductive thin film deposited on a side of said anticorrosive elastic diaphragm electrode so as to face said rigid fixed electrode.

8. The anticorrosive capacitive vacuum sensor of claim 7, wherein said anticorrosive elastic diaphragm electrode is formed from one of silicon carbide, alumina and aluminum nitride.

9. The anticorrosive capacitive vacuum sensor of claim 4, wherein said anticorrosive elastic diaphragm electrode is formed from one of silicon carbide, alumina and aluminum nitride.

10. The anticorrosive capacitive vacuum sensor of claim 1, wherein said anticorrosive elastic diaphragm electrode contains doped impurities for enhancing the conductivity of said anticorrosive elastic diaphragm electrode.

11. The anticorrosive capacitive vacuum sensor of claim 10, wherein said anticorrosive elastic diaphragm electrode is formed from one of silicon carbide, alumina and aluminum nitride.

12. The anticorrosive capacitive vacuum sensor of claim 1, further including an electrically conductive thin film deposited on a side of said anticorrosive elastic diaphragm electrode so as to face said rigid fixed electrode.

13. The anticorrosive capacitive vacuum sensor of claim 12, wherein said anticorrosive elastic diaphragm electrode is formed from one of silicon carbide, alumina and aluminum nitride.

14. The anticorrosive capacitive vacuum sensor of claim 1, wherein said anticorrosive elastic diaphragm electrode is formed from one of silicon carbide, alumina and aluminum nitride.

* * * * *